(12) United States Patent
Saunier

(10) Patent No.: US 7,699,345 B2
(45) Date of Patent: Apr. 20, 2010

(54) COVER FOR A STEERING COLUMN

(75) Inventor: Maxime Saunier, Montigny-le-Bretonneux (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/088,811

(22) PCT Filed: Sep. 27, 2006

(86) PCT No.: PCT/FR2006/050948

§ 371 (c)(1),
(2), (4) Date: Oct. 16, 2008

(87) PCT Pub. No.: WO2007/036675

PCT Pub. Date: Apr. 5, 2007

(65) Prior Publication Data

US 2009/0151504 A1 Jun. 18, 2009

(30) Foreign Application Priority Data

Sep. 30, 2005 (FR) .................................. 05 09987

(51) Int. Cl.
B62D 21/00 (2006.01)
(52) U.S. Cl. ..................................................... 280/779
(58) Field of Classification Search ................ 280/779, 280/775; 74/493, 492
See application file for complete search history.

(56) References Cited

U.S. PATENT DOCUMENTS

| 4,541,298 | A | * | 9/1985 | Strutt ........................... 74/493 |
| 6,139,057 | A | * | 10/2000 | Olgren et al. ................ 280/775 |
| 6,189,405 | B1 | * | 2/2001 | Yazane ......................... 74/493 |
| 6,357,318 | B1 | * | 3/2002 | Koellisch et al. .............. 74/493 |
| 6,460,427 | B1 | * | 10/2002 | Hedderly ...................... 74/493 |
| 6,952,979 | B2 | * | 10/2005 | Cartwright et al. ............ 74/493 |
| 2003/0098574 | A1 | | 5/2003 | Budaker et al. |

FOREIGN PATENT DOCUMENTS

| DE | 296 24 621 | 8/2005 |
| EP | 0 838 387 | 4/1998 |
| EP | 1 207 093 | 5/2002 |

* cited by examiner

*Primary Examiner*—Faye M. Fleming
(74) *Attorney, Agent, or Firm*—Oblon, Spivak, McClelland, Maier & Neustadt, L.L.P.

(57) ABSTRACT

The invention concerns a cover for a motor vehicle steering column (10), said motor vehicle comprising an instrument panel (12), said steering column (10) comprising a fixed portion (16) and a mobile portion (18), said fixed portion (16) being mounted in fixed position through said instrument panel (12), while said mobile part (18) is mounted sliding on the fixed part (16), said cover including a shell (14) for covering the steering column (10), said shell being adapted to be mounted secured in translation to the mobile portion (18), said cover further comprising means for guiding in translation (22, 24). The invention is characterized in that said guiding means (22, 24) are adapted to be installed between said fixed portion (16) and said shell (14) to guide said shell (14) in translation relative to said fixed portion (16).

6 Claims, 2 Drawing Sheets

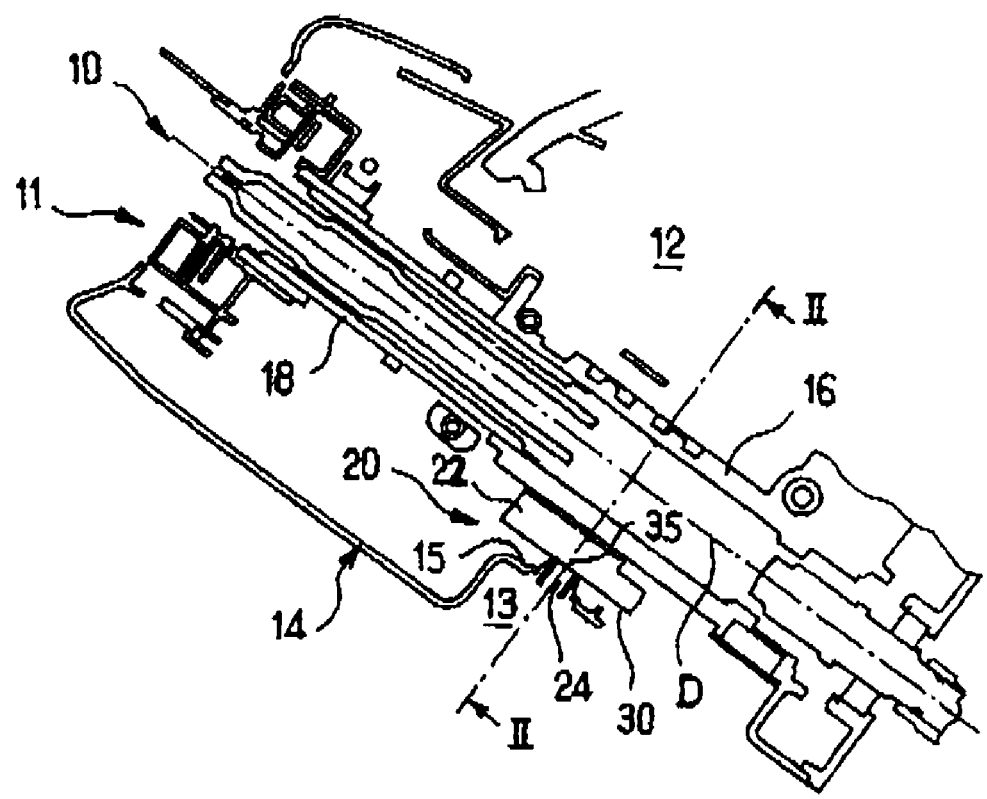
FIG_1
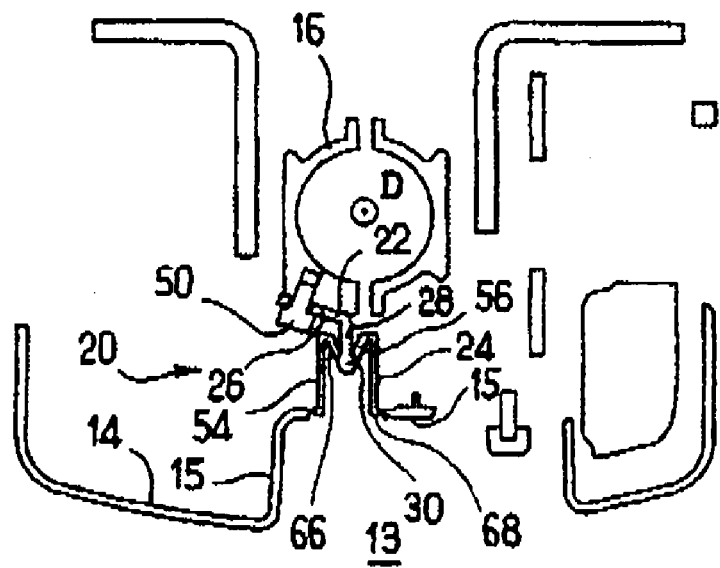
FIG_2

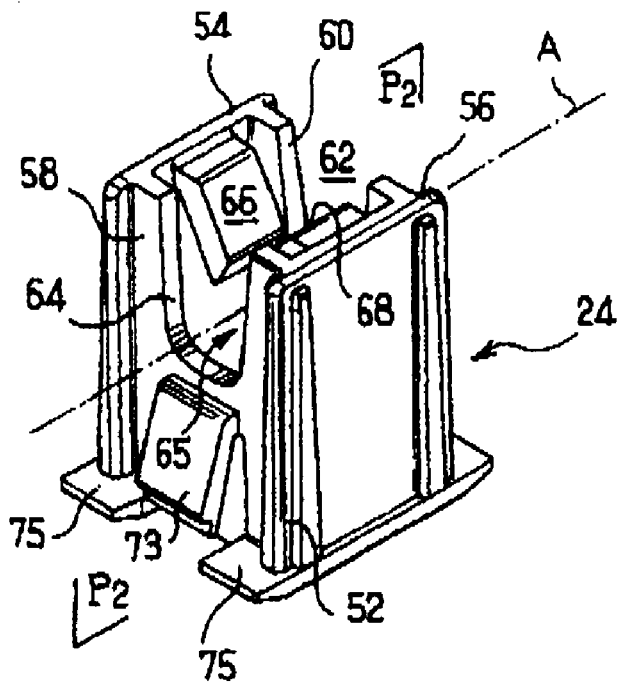
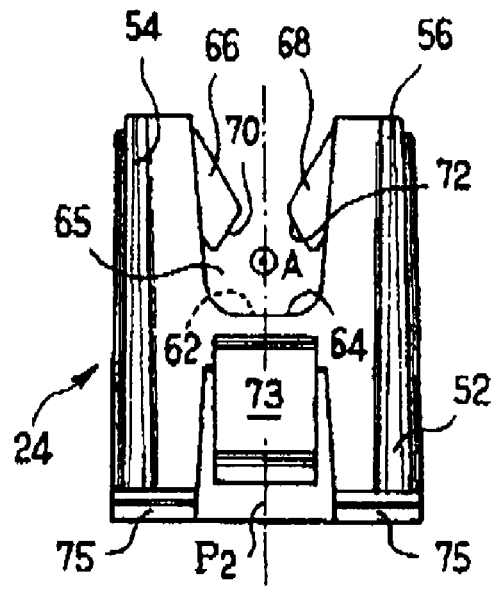
FIG. 3
FIG. 4
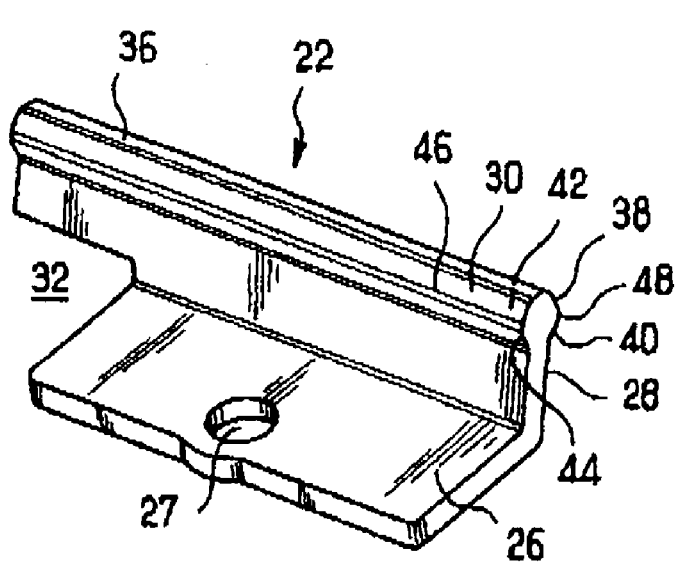
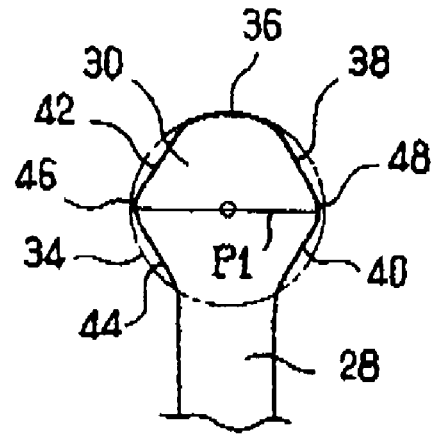
FIG. 5
FIG. 6

COVER FOR A STEERING COLUMN

The present invention relates to a cover for a motor vehicle steering column.

By means of a shell, known covers already cover steering columns in two portions, mobile one relative to the other.

Motor vehicles usually comprise a wheel-axle unit with steerable wheels, separate from a passenger compartment, and an instrument panel located inside the passenger compartment. They are equipped with a steering column a fixed portion whereof passes through the instrument panel to connect with the wheel-axle unit and to be more precise the steering members of the motor vehicle, and a mobile portion whereof, equipped with a steering wheel, is slidingly mounted in the fixed portion so as to be able to adjust the position of said steering wheel in the passenger compartment.

The shell is intended to conceal the steering column and other control members of the vehicle, and above all to conceal the junction between the two steering column portions. Furthermore, the shell is generally fastened to the mobile portion, and can therefore be moved in translation relative to the floor or relative to the fixed portion when the steering wheel is adjusted.

To guide this shell in translation, mounting it inside a sheath fastened to the instrument panel has been envisaged, the shell then being adapted to be moved in translation in the sheath when the steering wheel is adjusted.

See in particular the document EP 838 387, which describes this kind of cover. In that document, a first cover member is slidingly mounted in the instrument panel while a second cover member is pivotingly mounted relative to the first member.

However, one disadvantage of this arrangement is that it necessitates bulky complementary members that are fitted around the shell in order to be able to guide it.

A problem that also arises, and that the present invention seeks to solve, is to provide a cover the shell whereof can not only be guided in translation but can also be guided without encumbering the instrument panel.

The document EP1207093 describes a cover a first member whereof is pivotingly mounted on the instrument panel and a second member whereof is slidingly mounted on the first member. The device of that document has the drawback that it cannot be adapted to the geometry or the architecture of the driving station.

A first aspect of the present invention proposes a cover for a motor vehicle steering column, said motor vehicle comprising an engine unit and a passenger compartment separated from each other by an instrument panel, said steering column comprising a fixed portion connected to said engine unit and a mobile portion terminated by a steering wheel, said fixed portion being mounted in fixed position through said instrument panel, while said mobile portion is slidingly mounted on said fixed portion.

The cover comprises a shell for covering said steering column, said shell being adapted to be mounted on and fastened in translation to said mobile portion and at least partially surrounding said mobile portion and said fixed portion.

Said cover further comprises translation guide means for guiding movement of said shell in translation when said mobile portion is moved in translation.

Said guide means are adapted to be installed between said fixed portion and said shell to guide movement of said shell in translation relative to said fixed portion.

Thus one feature of the invention lies in the use of guide means, not around the shell, but inside it, between it and the fixed portion of the steering column. As a result, there is no need to provide bulky members around the shell and integrated into the instrument panel in order to be able to guide the shell in translation when the steering wheel is adjusted.

In one particularly advantageous embodiment of the invention, said column extending in a given direction, said guide means comprise a slideway in which a sliding member is engaged, said sliding member being adapted to slide in said slideway substantially in said given direction. As a result, the slideway and the sliding member, one being mounted in the shell while the other is mounted on the fixed portion, guide rectilinear movement in translation of the slideway relative to the fixed portion when they are engaged one within the other. In one preferred embodiment of the invention, said slideway is mounted in said shell, while said sliding member is fastened to said fixed portion, with the result that it is the slideway that is moved in translation relative to the sliding member, which is engaged inside the slideway. The mode of operation of the sliding member and the slideway will be explained in more detail in the detailed description.

In one particularly advantageous embodiment of the invention, said sliding member includes a profiled member comprising two flanges inclined one relative to the other, a fixing flange fastened to said fixed portion and a connecting flange terminated by an enlarged free edge, said enlarged free edge being adapted to cooperate with said slideway. Thus when the fixing flange is held pressed onto the fixed portion, the connecting flange projects from the fixed portion and, as a result, is adapted to be engaged in the slideway.

Furthermore, it is particularly advantageous if said slideway includes a U-shaped member, said U-shaped member having a base fastened to said shell and two facing free flanges between which said sliding member is adapted to slide. Furthermore, although the shell is mounted in such a manner as to be held pressed toward the sliding member, said U-shaped member nevertheless, and particularly advantageously, includes elastic retaining means adapted to trap said enlarged free edge after clipping. As a result, despite vibrations and sharp braking of the vehicle or impacts, the sliding member remains engaged in the slideway to fulfill the function of guiding movement in translation of the shell along the fixed portion of the steering column.

As will be described in more detail hereinafter, said elastic retaining means preferably comprise two opposed elastically deformable tongues mounted on the two facing flanges, respectively, and oriented one toward the other. These two elastically deformable tongues can therefore be easily obtained by molding said U-shaped member in one piece with the tongues, and moreover, during fitting, after installing the sliding member on the fixed portion of the steering column, the slideway is attached so that the enlarged free edge is clipped into the U-shaped member.

A second aspect of the invention concerns a motor vehicle comprising a wheel-axle unit with steerable wheels and a passenger compartment with an instrument panel, said steering column comprising a fixed portion connected to said wheel-axle unit and a mobile portion terminated by a steering wheel, said fixed portion being mounted in fixed position through said instrument panel, while said mobile portion is slidingly mounted on said fixed portion, said motor vehicle comprising a cover for the steering column, said cover comprising a shell for covering said steering column, said shell being adapted to be mounted on and fastened in translation to said mobile portion at least partially surrounding said mobile portion and said fixed portion, said cover further comprising translation guide means for guiding movement of said shell in translation when said mobile portion is moved in translation; according to the invention, said cover is a cover for the steering column according to said first aspect, said guide means being installed between said fixed portion and said shell to guide movement of said shell in translation relative to said fixed portion.

Other features and advantages of the invention will emerge from a reading of the description given hereinafter of one particular embodiment of the invention, provided by way of nonlimiting illustration, with reference to the appended drawings, in which:

FIG. 1 is a diagrammatic view in axial section of the cover according to the invention;

FIG. 2 is a diagrammatic view in cross section taken along a line II-II in FIG. 1;

FIG. 3 is a diagrammatic perspective view of a detail of FIG. 1;

FIG. 4 is a diagrammatic front view of the detail of FIG. 3;

FIG. 5 is a diagrammatic view of a detail of FIG. 2; and

FIG. 6 is a diagrammatic view in cross section of a detail of FIG. 5.

FIG. 1 shows in axial section a steering column 10 of a motor vehicle, not shown, a cover 11 and an instrument panel 12; the cover 11 comprising a shell 14 that at least partially surrounds the steering column 10, which shell 14 has a depression 13 formed in a lower skirt 15. The steering column 10 includes a fixed portion 16 and a mobile portion 18; the mobile portion 18, to which the shell 14 is fastened, being slidingly mounted in the fixed portion 16. This mobile portion 18 is terminated by a steering wheel, not shown, located in the passenger compartment. The fixed portion 16 is mounted in fixed position through the instrument panel 12 to be connected to steering members, not shown, of a front driving train of said motor vehicle. It is therefore here a question of being able to adjust the relative position of the mobile portion 18 with respect to the fixed portion 16 in a longitudinal direction D of the steering column 10 and as a result to adjust the position of the steering wheel in the passenger compartment. Means, not shown, for immobilizing the mobile portion 18 relative to the fixed portion 16 are adapted to hold them together.

Moreover, the cover 11 comprises means 20 for guiding movement in translation of the shell 14 relative to the fixed portion 16, enabling the shell to be guided in translation in the longitudinal direction r) when the mobile portion 18 is adjusted.

The translation guide means 20 include a member 22, for example in the form of a profiled section, forming a sliding member, referred to hereinafter as the profiled member 22, and fastened to the fixed portion 16, and a U-shaped member 24 forming a slideway with which the profiled member 22 cooperates.

FIG. 2 shows in cross section the fixed portion 16 of the steering column 10, the shell 14 that partially surrounds the fixed portion 16, and the translation guide means 20 including the profiled member 22 and the U-shaped member 24, the latter being fastened to the lower skirt 15.

The profiled member 22 will be described in detail first with reference to FIG. 5, in which it is shown in perspective. This profiled member 22 has two flanges of similar width inclined to each other at an angle of around 90°; a fixing flange 26 in which a bore 27 is formed so that it can be held pressed onto the aforementioned fixed portion 16, and a connecting flange 28 terminated by an enlarged free edge 30. Also, the profiled member 22 has a cut-out 32 formed essentially in the fixing flange 26.

Furthermore, the enlarged free edge 30, which is shown in detail in FIG. 6, and in cross section, has a substantially hexagonal symmetrical section circumscribed by a circle 34, one face 36 whereof is opposite the body of the connecting flange 28 and four other faces 38, 40, 42, 44 whereof define, two by two, two diametrically opposite edges 46, 48 which define a plane $P_1$ substantially perpendicular to said body of the connecting flange 28.

Accordingly, referring again to FIG. 2, there is seen the profiled member 22 the fixing flange 26 whereof is held in fixed position and pressed against the fixed portion 16 by a screw 50 passing through the bore 27 and screwed into the fixed portion 16. Furthermore, the profiled member 22 is mounted so that the connecting flange 28 projects substantially radically away from the fixed portion 16 and, most importantly, so that the enlarged free edge 30 is parallel to the longitudinal direction D of the steering column 10 and cooperates with the U-shaped member 24. The mode of cooperation of the connecting flange 28 and the U-shaped member 24 will be described hereinafter, after this U-shaped member 24 is described accurately with reference to FIGS. 3 and 4.

Thus FIG. 3 shows the U-shaped member 24 consisting of a base 52 and two facing free flanges 54, 56 symmetrical to each other with respect to a plane $P_2$. Also, the two free flanges 54, 56 are connected together by two opposed spacers 58, 60 in which two respective facing notches 62, 64 are formed; the two notches 62, 64 then defining a groove 65, or slideway, with an axis A of symmetry, extending between the two free flanges 54, 56. Moreover, the U-shaped member 24 includes two facing elastically deformable tongues 66, 68 extending from the end of the facing free flanges 54, 56, respectively, in the groove 65 and converging toward each other and toward the base 52.

FIG. 4 shows the U-shaped member 24, seen along the axis A of the groove 65, the two facing free flanges 54, 56 equipped with their facing tongues 66, 68, respectively. The tongues 66, 68 each have a bearing free end 70, 72 inclined one relative to the other symmetrically with respect to the plane $P_2$ so as partially to close the groove 65.

Moreover, the U-shaped member 24 is molded in one piece from plastic material so that the tongues 66, 68 are naturally elastically retractable toward their respective free flanges 54, 56, which is particularly advantageous. Also, two fixing tongues 73 and two fixing plates 75 are provided in the base 52. The two fixing plates 75 project from the free flanges 54, 56 to form a shoulder while the fixing tongues 73 are inclined and extend toward the shoulder, so that the U-shaped member 24 can be clipped into a cut-out formed in the shell 14. The base 52 is then fastened to the wall of the shell 14, while the two free flanges 54, 56 project from the wall of the shell 14 toward the interior of the skirt 15.

Accordingly, the enlarged free edge 30 of the connecting flange 28, shown in FIGS. 5 and 6, is adapted to be engaged in the U-shaped member 24. It is adapted to be engaged between the two free flanges 54, 56 of the U-shaped member 24 in the groove 65 so that the enlarged free edge 30 bears against the edge of the two notches 62, 64 in the bottom of the groove 65 and is trapped therein by the two tongues 66, 68 which, after being moved apart to allow the enlarged free edge 30 to pass between them, resume their relaxed position, in which their bearing free ends 70, 72 bear against the faces 44, 40, respectively, of the hexagonal section of the enlarged free edge 30.

Referring to FIG. 2, the connecting flange 28 is therefore seen engaged in the U-shaped member 24 so that the shell 14, which is fastened to the U-shaped member 24, with its base 52 clipped into the wall of the shell 14, is retained to the fixed portion 16 by the profiled member 22, obviously within the limit of elastic deformation of the tongues 66, 68.

On the other hand, the enlarged free edge 30, which is substantially aligned with the axis A of symmetry, can slide freely inside the groove 65, between the two free flanges 54, 56, along this axis A of symmetry and substantially parallel to the longitudinal direction D of the steering column 10.

To be more precise, and as shown in FIG. 1, it is the U-shaped member 24 to which the shell 14 is fastened that is mobile in translation in the longitudinal direction D of the column 10 relative to the profiled member 22 which is fastened to the fixed portion 16 of the steering column 10; the enlarged free edge 30 then sliding in the groove 35 of the U-shaped member 24. It is evident that guiding movement in translation of the shell 14 is possible over only a limited stroke, corresponding to the length of the enlarged free edge 30. Thus, the length of the enlarged free edge 30 corresponds at least to the possible amplitude of adjustment of the steering wheel.

The invention claimed is:

1. A cover for a motor vehicle steering column, said steering column extending in a given direction, said motor vehicle comprising a wheel-axle unit with steerable wheels and a passenger compartment with an instrument panel, said steering column comprising a fixed portion connected to said wheel-axle unit and a mobile portion terminated by a steering wheel, said fixed portion being mounted in fixed position through said instrument panel, while said mobile portion is slidingly mounted on said fixed portion, said cover comprising a shell for covering said steering column, said shell being adapted to be mounted on and fastened in translation to said mobile portion at least partially surrounding said mobile portion and said fixed portion, said cover further comprising translation guide means for guiding movement of said shell in translation when said mobile portion is moved in translation;

wherein said guide means are adapted to be installed between said fixed portion and said shell to guide movement of said shell in translation relative to said fixed portion, said guide means comprise a slideway in which a sliding member is engaged, said slideway including a U-shaped member, said U-shaped member having a base fastened to said shell and two facing free flanges, said sliding member being adapted to slide between said free flanges substantially in said given direction.

2. The cover as claimed in claim 1, wherein said slideway is mounted in said shell, while said sliding member is fastened to said fixed portion.

3. The cover as claimed in claim 1 or 2, that wherein said sliding member includes a profiled member comprising two flanges inclined one relative to the other, a fixing flange fastened to said fixed portion and a connecting flange terminated by an enlarged free edge, said enlarged free edge being adapted to cooperate with said slideway.

4. The cover as claimed in claim 3, wherein said U-shaped member includes elastic retaining means adapted to trap said enlarged free edge after clipping.

5. The cover as claimed in claim 4, wherein said elastic retaining means comprise two opposed elastically deformable tongues mounted on the two facing flanges, respectively, and oriented one toward the other.

6. A motor vehicle comprising a wheel-axle unit with steerable wheels and a passenger compartment with an instrument panel, said steering column comprising a fixed portion connected to said wheel-axle unit and a mobile portion terminated by a steering wheel, said fixed portion being mounted in fixed position through said instrument panel, while said mobile portion is slidingly mounted on said fixed portion, said motor vehicle comprising a cover for the steering column, said cover comprising a shell for covering said steering column, said shell being adapted to be mounted on and fastened in translation to said mobile portion at least partially surrounding said mobile portion and said fixed portion, said cover further comprising translation guide means for guiding movement of said shell in translation when said mobile portion is moved in translation;

wherein said cover is a cover for the steering column as claimed in claim 1, said guide means being installed between said fixed portion and said shell to guide movement of said shell in translation relative to said fixed portion.

* * * * *